United States Patent
Gecgel et al.

(10) Patent No.: US 12,027,796 B2
(45) Date of Patent: Jul. 2, 2024

(54) SEALING AND INSULATING ARRANGEMENT FOR A DEVICE USED FOR DRIVING A COMPRESSOR AND DEVICE FOR DRIVING A COMPRESSOR

(71) Applicant: Hanon Systems, Daejeon (KR)

(72) Inventors: Senol Gecgel, Cologne (DE); Bernd Guntermann, Lennestadt (DE); Eric Rooks, Bonn (DE)

(73) Assignee: HANON SYSTEMS, Daejeon (KR)

( * ) Notice: Subject to any disclaimer, the term of this patent is extended or adjusted under 35 U.S.C. 154(b) by 224 days.

(21) Appl. No.: 17/596,751

(22) PCT Filed: Sep. 25, 2020

(86) PCT No.: PCT/KR2020/013137
§ 371 (c)(1),
(2) Date: Dec. 17, 2021

(87) PCT Pub. No.: WO2021/066428
PCT Pub. Date: Apr. 8, 2021

(65) Prior Publication Data
US 2022/0228599 A1  Jul. 21, 2022

(30) Foreign Application Priority Data
Oct. 1, 2019 (DE) .................... 10 2019 126 499.5

(51) Int. Cl.
*H01R 13/52* (2006.01)
*H01R 13/04* (2006.01)
(Continued)

(52) U.S. Cl.
CPC ........... *H01R 13/521* (2013.01); *H01R 13/04* (2013.01); *H02K 5/10* (2013.01); *H02K 5/225* (2013.01)

(58) Field of Classification Search
CPC ........ H01R 13/521; H01R 13/04; H02K 5/10; H02K 5/225
(Continued)

(56) References Cited

U.S. PATENT DOCUMENTS 5,391,061 A    2/1995   Iizuka et al.
5,830,012 A *  11/1998  Ortega ............... B29C 45/0003
                                                    439/937

(Continued)

FOREIGN PATENT DOCUMENTS

CN    204144463 U   2/2015
CN    107709786 A   2/2018
(Continued)

*Primary Examiner* — Gary F Paumen
(74) *Attorney, Agent, or Firm* — Shumaker, Loop & Kendrick, LLP; James D. Miller

(57) ABSTRACT

A sealing-and-insulating arrangement for guiding electrical connections through a housing. The sealing-and-insulating arrangement exhibits a connection arrangement with at least one electrically conductive connecting element and a retaining element, as well as a support element with a mounting element with a connection pass-through that is enclosed by a wall. Here, the connecting element is arranged in such a way that it is enclosed by the retaining element and has both a form and fluid-tight connection to the retaining element via a form element and that the connecting element projects beyond the retaining element with a first and a second section. The connecting element is arranged such that its first section projects through the connection pass-through and into the mounting element.

26 Claims, 3 Drawing Sheets

(51) Int. Cl.
*H02K 5/10* (2006.01)
*H02K 5/22* (2006.01)

(58) Field of Classification Search
USPC .......................................... 439/587, 935, 937
See application file for complete search history.

(56) References Cited

U.S. PATENT DOCUMENTS

| | | | | |
|---|---|---|---|---|
| 7,081,012 | B2* | 7/2006 | Gensert | B60K 15/03 |
| | | | | 439/935 |
| 8,420,933 | B2* | 4/2013 | Harada | H01B 17/305 |
| | | | | 439/935 |
| 8,618,419 | B2 | 12/2013 | Fukasaku et al. | |
| 8,840,381 | B2 | 9/2014 | Fukasaku et al. | |
| 2012/0228023 | A1 | 9/2012 | Fukasaku et al. | |
| 2019/0052144 | A1 | 2/2019 | Heo et al. | |

FOREIGN PATENT DOCUMENTS

| | | |
|---|---|---|
| DE | 112015001426 T5 | 12/2016 |
| EP | 2309128 A1 | 4/2011 |
| FR | 2973604 A1 | 10/2012 |
| JP | 63051983 U | 4/1988 |
| JP | 2011241799 A | 12/2011 |
| JP | 2013148037 A | 8/2013 |
| JP | 2015183668 A | 10/2015 |
| KR | 20170074210 A | 6/2017 |
| KR | 20180023166 A | 3/2018 |

* cited by examiner

SEALING AND INSULATING ARRANGEMENT FOR A DEVICE USED FOR DRIVING A COMPRESSOR AND DEVICE FOR DRIVING A COMPRESSOR

CROSS-REFERENCE TO RELATED PATENT APPLICATIONS

This application is a United States nation phase patent application based on PCT/KR2020/013137 filed on Sep. 25, 2020, which claims the benefit of German Patent Application No. 10 2019 126 499.5 filed on Oct. 1, 2019, the entire disclosures of which are hereby incorporated herein by reference.

TECHNICAL FIELD

The present invention relates to a sealing-and-insulating arrangement for routing electrical connections through a wall of a housing for a device used to drive a compressor. The present invention also relates to a device for driving a compressor, in particular an electric motor, for compressing a vaporous fluid, specifically a refrigerant. The compressor can be used in the refrigerant circuit of a motor vehicle air-conditioning system.

BACKGROUND ART

Compressors known from the state of the art for mobile applications, in particular as air-conditioning systems in motor vehicles, that are used for conveying refrigerant through a refrigerant circuit, also known as refrigerant compressors, are often constructed as piston compressors with variable displacement or as scroll compressors irrespective of the refrigerant used. The compressors are driven either via a belt pulley or electrically here.

Alongside the electric motor for driving the respective compression mechanism, an electrically driven compressor also exhibits an inverter for driving the electric motor. The inverter is used to convert the direct current (DC) supplied by a vehicle battery into alternating current (AC), which is then fed to the electric motor through electrical connections.

Conventional electric motors of electrically driven compressors can be produced with a ring-shaped stator core, together with coils arranged on the core, and a rotor, wherein the rotor is arranged inside the stator core. The rotor and stator are aligned on a common symmetry axis or rotational axis of the rotor.

The inverter exhibits plug-in sockets to receive plug-in connectors that are produced as pins and used for establishing electrical connections to connections on the electric motor, which themselves are electrically connected to connection lines of conducting wires of the stator coils. The connections of the electric motor are produced in a connector housing which is, for example, arranged on an end face of the stator aligned in the axial direction of the stator.

When fitting the compressor, the plug-in connectors, which are produced as pins, are each inserted into a connection socket provided in the connector housing and contacted to an end piece, which itself is connected to a corresponding conducting wire, in particular a connection line of the conducting wire. Here, the end piece is connected both electrically and mechanically to the connection line of the conducting wire, thereby ensuring that there is only a low contact resistance between the plug-in connector of the inverters and conducting wire. In addition to the uninsulated ends of the connection lines or conducting wires, also referred to as phase conductors, the plug-in connectors are also to be electrically insulated from one another and from other electrically conductive components of the stator, as well as the motor housing, specifically hermetically sealed, as a way of also guaranteeing an electrical connection with a high insulation resistance, since the fluid that is for example flowing through the compressor, a mix of refrigerant and oil, can reduce the insulation resistance between the plug-in connectors and the connections or between the connections and other, also inactive metal parts of the electric motor or the motor housing. In addition to this, the connector housing is to be electrically insulated and hermetically sealed from the plug-in connectors that project beyond the motor housing and are aligned with the inverter, itself arranged outside the motor housing, to ensure that no refrigerant and/or oil that is flowing in the compressor can escape into the atmosphere and that no short-circuits or indeed any other damage can occur in the inverter, in particular to components that are arranged on a PCB of the inverter.

To maintain the required insulation resistances of the electrical components and insulate the live elements reliably and fully from fluids flowing in the motor housing, as well as any soiling that occurs, glass-to-metal feedthroughs are typically used for the plug-in connectors, wherein the live elements are sealed off using elastic molded parts. Due to the stipulated dimensions and necessary electrical parameters, the glass, which serves as the insulation material and also holder for the respective plug-in connector, exhibits a specific shape.

Not only is the form of the glass projections on the glass-to-metal feedthroughs both difficult to specify and reproduce, it is also subject to very large deviations in terms of both shape and volume due to the manufacturing process. When manufacturing the glass-to-metal feedthroughs, the glass is introduced into a melting device in the form of sintered hollow cylinders together with the pin-shaped plug-in connector, as well as holders. The tolerances of all the components to be bonded are added together here. To achieve the desired glass shape and also guarantee reliability, a large number of very time-consuming experiments needs to be performed with various glass volumes and production parameters. In addition to this, verification of reliable compliance with the requisite limits needs to be provided through complex tests and capability certificates. A sleeve with a perfectly matched surface is required in order to cover or seal the glass surfaces. Here, the major deviations of the seals need to be compensated with a high degree of flexibility and precision. The requirement of high precision is, in particular, very difficult to guarantee when using molded elastomer parts as sealing elements.

WO 2015 146677 A1 describes an electrically driven compressor with a compression arrangement, an electric motor for driving the compression arrangement and an inverter for powering the electric motor. The electric motor exhibits a rotor and a stator with an electrically insulating coil body that is arranged on one end of a stator core, as well as coils arranged on the coil body and a connector housing with connections for establishing electrical connections between the coils to the inverter. The end face of the connector housing is mechanically connected to the stator on the coil body.

The plug-in connectors, each inserted into a connection socket provided in the connector housing, are zonally jacketed with ring-type insulators that establish a connection to a hermetically sealing plate. Firstly, a hermetic seal is arranged between the plate and a partition wall of the motor housing that faces the inverter. Secondly, electrically insulating, ring-type sealing elements are provided between each insulator and the connector housing, i.e. on the outer circumferences of the plug-in connector insulators. The plug-in connectors are inserted into openings produced in the connector housing together with the insulators and the sealing elements, so that the plug-in connectors are arranged such that they are guided through the motor housing in a fluid-tight way. However, the sealing elements serve only to seal off the plug-in connectors in the radial direction. In addition to this, attention must be paid to ensure the correct installation direction is used when fitting the components due to the lack of radial and quasi axial symmetry.

To ensure adequate sealing functionality, in particular adequate sealing of the compressor against the environment and adequate insulation against the refrigerant flowing through the compressor, as well as for housing elements arranged adjacently to one another, the plug-in connectors are consequently fitted to the connector housing with a large number of different sealing elements, which means that the arrangement requires a large number of components and makes assembly highly complex. In addition to this, the risk of failure and faults is very high due to the use of a large number of different components.

SUMMARY

The object of the invention lies in provision of a sealing-and-insulating arrangement for a device used to drive an electrically driven compressor of a vaporous fluid, in particular an electric motor, that is easy to manufacture and saves times during installation. The arrangement should exhibit as low a number of individual components as possible, as well as featuring a design that is easy to produce, also to minimize manufacturing costs. Here, the complexity of the design of the sealing-and-insulating arrangement, and thereby also of the device, should in particular be minimized, as well as inaccuracies eliminated, wherein the sealing of the hermetic system against the environment and the electrical insulation inside the compressor are both optimized at the same time. The arrangement should also be produced in such a way that the necessary insulation resistances of the system are guaranteed.

The task is resolved by the subject matter with the characteristics as disclosed herein.

The task is resolved by a sealing-and-insulating arrangement according to the invention for guiding electrical connections through a housing, in particular through a wall of the housing, for a device used to drive a compressor. The sealing-and-insulating arrangement exhibits a connection arrangement with at least one electrically conductive connecting element and a retaining element, as well as a support element with a mounting element that itself exhibits a connection pass-through. The connection pass-through is fully enclosed by a wall.

In addition to this, the at least one connecting element is arranged such that it is fully enclosed by the retaining element and firmly attached to the retaining element via a form element in a fluid-tight connection in such a way that the connecting element projects out of the retaining element in a first section and a second section. Here, the connecting element is arranged such that its first section projects through the connection pass-through and into the mounting element.

According to the design of the invention, at least the first section of the at least one connecting element is fully enclosed by an insulation element at least zonally. The insulation element that is firmly attached to the retaining element and extends towards the wall of the support element, starting from the retaining element, is arranged such that it encloses the first section of the connecting element in a fluid-tight way in connection with the wall that produces the connection pass-through.

The connecting element preferably serves to establish connections between electrical connections arranged inside the support element and electrical connections arranged outside the housing. Here, the mounting element is advantageously produced with the electrical connections in order to mount a connector housing. The connecting element can be inserted into the connector housing and an electrical connection arranged inside it.

As per a further embodiment of the invention, only the first section of the at least one connecting element is fully enclosed by an insulation element at least zonally.

As per an advantageous embodiment of the invention, the connecting element is produced as a pin-like plug-in connector with a cylindrical shape that preferably exhibits the form of a straight pin. The connecting element is, in particular, produced such that it exhibits a circular cylinder shape with a constant external diameter.

As per a preferred embodiment of the invention, the wall that encloses the connection pass-through of the mounting element is aligned in an axial direction with the housing and arranged such that it projects from the mounting element.

The wall that encloses the connection pass-through of the mounting element is preferably produced with a circular hollow cylinder shape and attached to the mounting element around its entire perimeter with a first face that is aligned in the axial direction. A second end face of the wall that is produced distally to the first end face is aligned in the direction of the connection arrangement.

Another advantage of the invention lies in the fact that the insulation element exhibits the shape of a sleeve, in particular a circular hollow cylinder-shaped sleeve with constant internal diameter, with two end faces.

The insulation element is preferably firmly attached to the retaining element on a first end face, exhibiting a fluid-tight connection around its entire perimeter. A second end face of the insulation element that is aligned distally to the first end face is preferably aligned towards the support element and produced as a free end.

The connecting element, enclosed in full at least zonally by the insulation element, itself advantageously produced from a ceramic material, can be arranged such that its first section projects beyond the insulation element on the second end face of the insulation element.

According to another preferred embodiment of the invention, the connecting element and the insulation element are arranged and aligned coaxially with one another in such a way that a gap is produced between the connecting element and the insulation element.

As per a further embodiment of the invention, the retaining element is produced in a plate-like shape with surfaces arranged opposite one another and at least one pass-through opening for mounting the at least one connecting element. Here, the first section and the second section of the connecting element are arranged such that they project out of the opposing surfaces of the retaining element and a third section of the connecting element is arranged inside the pass-through opening. The sections of the connecting element are aligned such that they extend along a common axis, in particular a longitudinal axis.

Another advantage of the invention lies in the fact that a gap produced between the connecting element, in particular the third section of the connecting element, and the retaining element, specifically between the connecting element and a wall that runs around the pass-through opening on the retaining element, is filled by the form element. The form element is preferably produced as a glass form element or glass body.

According to a first alternative embodiment of the invention, the sealing-and-insulating arrangement is produced with at least one function element, which is arranged such that it seals off the wall of the mounting element and the insulation element against one another. Here, the function element is produced both to provide a fluid-tight seal for electrical connections and to electrically insulate the electrical connections.

The at least one function element preferably exhibits the shape of a sleeve, in particular an essentially circular hollow cylinder-shaped sleeve, with a first section and a second section. The two sections each extend in the axial direction and are connected to one another via a third section, which is produced as a seating surface. Here, the first section extends from a first end face up to the seating surface, while the second section extends from a second end face up to the seating surface. The seating surface of the function element is preferably produced such that projects in the radial direction beyond outer surfaces of the first or second section and fully encloses the function element. The function element also exhibits a pass-through opening for receiving the connecting element that extends in the axial direction from the first end face to the second end face.

As per a further embodiment of the invention, the first section and the second section of the function element are each produced with an essentially constant wall thickness. Here, at least one sealing lip that projects beyond the outer surface can be provided on an outer surface of the sections. The sealing lips, in particular at least two sealing lips in each case, are produced such that they fully enclose the outer surface of the respective section.

The function element is advantageously arranged with the first section in the slot-like intermediate space formed between the connecting element and the insulation element and with the second section in a slot-like intermediate space that is formed between the connecting element and the wall of the connection pass-through on the mounting element. Here, the function element is in contact with an inner surface of the wall of the insulation element via an outer surface of the first section, as well as the at least one sealing lip produced on the outer surface, and with the inner surface of the connection pass-through of the mounting element via an outer surface of the second section and the at least one sealing lip produced on the outer surface.

In addition to this, the function element can firstly be arranged such that the seating surface is in contact with the second end face of the insulation element and secondly that it is in contact with the second end face of the wall of the connection pass-through.

The function element is preferably produced from an elastomer in order to guarantee an electrically insulating and sealing connection on the contact surfaces or sealing surfaces.

According to another advantageous embodiment of the invention, the sealing-and-insulating arrangement exhibits an equal number of function elements with production of at least two connecting elements, walls of connection pass-throughs and insulation elements. Here, the function elements are produced as a one-piece function element arrangement.

Two function elements, which are arranged adjacently to one another in each case, are preferably connected to one another via connection bridges in the area of the seating surfaces. Here, the longitudinal axes of the function elements each run parallel to one another, wherein the longitudinal axes of adjacent function elements are preferably aligned such that they are equally spaced from one another. The longitudinal axes of the function elements can be arranged on a common plane.

Another advantage of the invention lies in the fact that the at least one function element is produced with the support element as a one-piece component, in particular as a two-component element or a single-component element.

According to a second alternative embodiment of the invention, the wall of the mounting element and the insulation element of the connection arrangement are arranged such that they are in contact with and seal off one another without an intermediate function element.

As per a further embodiment of the invention, the wall that encloses the connection pass-through exhibits a bulging formation in a section of the second end face, itself produced and aligned distally to the first end face, on an outer surface that extends all the way around the wall.

The insulation element is advantageously produced in a section of the second end face, itself produced and aligned distally to the first end face, with a sealing surface on the inner surface that is arranged such that it covers the entire surface in the form of a chamfer. Here, an inner diameter of the insulation element is preferably produced such that it gets wider as is progresses to the second end face and corresponds to an external diameter of the formation of the wall that encloses connection pass-through.

The wall that encloses the connection pass-through is preferably arranged in a slot-like intermediate space that is produced between the connecting element and the insulation element. The wall with the formation is in fluid-tight contact with the sealing surface of the insulation element here.

The task is also resolved by a device according to the invention for driving a compressor of a vaporous fluid, in particular an electric motor. The device exhibits a rotor and a non-moving stator, which extend along a common longitudinal axis, as well as a housing.

The stator is advantageously positioned on an outer side of the rotor in the radial direction in such a way that it encloses the rotor.

According to the design of the invention, a support element with at least one mounting element for at least one connector housing is arranged on a first end face of the stator that is aligned in an axial direction. Here, the mounting element exhibits at least one connection pass-through with a wall for mounting at least one connecting element. In addition to this, the device is produced with a sealing-and-insulating arrangement according to the invention as described above.

Here, the axial direction is understood to mean the longitudinal axis of the stator, which also corresponds to the longitudinal axis and the rotary axis of the rotor. An end face aligned in the axial direction is arranged on a plane that is itself aligned vertically to the longitudinal axis.

An advantage of the invention lies in the fact that the support element and the at least one mounting element for the at least one connector housing are produced as a coherent unit and one-piece component, meaning that the mounting element is a component of the support element. As a multifunctional component, in particular of the stator, the support element is therefore preferably produced from a plastic, such as a polymer or thermoplast.

A process for mounting the device to drive a compressor of a vaporous fluid, in particular an electric motor, exhibits the following steps:

Attachment of at least one function element to a plug-in connector of a connection arrangement, including insertion of the function element with a first section into a slot-like, in particular a ring-shaped slot, intermediate space between the plug-in connector and an insulation element, wherein the function element is in contact with a wall of the insulation element in such a way that the wall fully encloses the function element, as well as Insertion of the at least one plug-in connector with the function element through at least one connection pass-through produced in the mounting element, starting from the top of a mounting element, and into a connection port of a connector housing that is arranged in the mounting element during attachment of a stator to a support element in a housing, wherein a second section of the function element is in contact with a wall on the mounting element that encloses the connection pass-through in such a way that the wall encloses the function element on all sides.

Here, the function element is preferably slid into the insulation element until a seating surface of the function element is in contact with an end face of the insulation element. In addition to this, the connection arrangement with the function element can be slid into the mounting element until the seating surface of the function element is in contact with an end face of the wall that encloses the connection pass-through.

The connector housing is preferably guided into the mounting element produced on the support element and attached to the support element.

During assembly of the device, a rotor and the stator are preferably arranged on a common longitudinal axis in such a way that the stator encloses the rotor in the radial direction.

The advantageous embodiment of the invention allows the device to be used to drive a compressor, in particular an electric motor, for compressing a vaporous fluid for a compressor of a refrigerant in a refrigerant circuit of a motor vehicle air-conditioning system.

The sealing-and-insulating arrangement according to the invention or the device according to the invention for driving a compressor of a vaporous fluid with the sealing-and-insulating arrangement collectively exhibit various other advantages:

A minimum number of components, for example since one or more separate sealing elements, depending on the number of connection elements, as well as additional fixings in comparison with arrangements known from the state of the art are omitted thanks to use of the connecting element in combination with the function element and the wall produced on the support element, wherein the wall is also produced with the support element in an injection molding process and the requirements in terms of the precision of the function element and the projection of the form element are less strictly defined.

Easy assembly, in particular when inserting the stator with the rotor inside the housing, especially since no additional sealing elements are required for sealing off the connection pass-throughs as openings in the mounting element that are used for guiding through the connection elements, while the shrinking in of the stator into the housing and the sealing are both performed in a single assembly step and the respective arrangement is produced symmetrically around the connecting element in both the radial and axial direction, as well as Maximum functional reliability as a result of the combination of both radial and axial sealing.

BRIEF DESCRIPTION OF DRAWINGS

Further details, features and benefits of embodiments of the invention result from the following description of embodiment examples with reference to the accompanying drawings. These display the following.

DETAILED DESCRIPTION OF AN EMBODIMENT

Figure 1A:
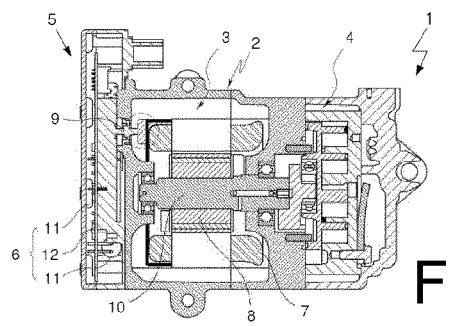
FIG. 1A: A sectional view of an electrically driven compressor with a device, in particular an electric motor, for driving a compression mechanism and an arrangement of an inverter.

FIG. 1A shows a sectional view of an electrically driven compressor 1 of a vaporous fluid, specifically for an air-conditioning system of a motor vehicle for pumping refrigerant through a refrigerant circuit, with an electric motor 3 arranged in a housing 2 as a device 3 for driving a compression mechanism 4 and an arrangement of an inverter 5. The electric motor 3 is powered via a switching device 6 of the inverter 5.

The electric motor 3 exhibits a stator 7 with an essentially hollow cylinder-shaped stator core and coils wound on the stator core, as well as a rotor 8 arranged inside the stator 7. The rotor 8 is set into rotation when electrical energy is supplied to the coils of the stator 7 via a connection arrangement 9. The connection arrangement 9 is produced on an end face of the stator 7 and exhibits a large number of electrical connections.

The rotor 8 is arranged coaxially inside the stator 7 and in such a way that it can be rotated around a rotary axis. A drive shaft 10 can be produced integrally with the rotor 8 or as a separate element.

The electric motor 3 and the compression mechanism 4, produced in the form of a scroll compressor with one fixed and one orbiting scroll, are arranged inside a volume enclosed by the housing 2. Here, the housing 2 comprises a first housing element for mounting the electric motor 3 and a second housing element for mounting the compression mechanism 4, preferably produced from a metal, in particular an aluminum.

The orbiting scroll of the compression mechanism 4, in which the vaporous fluid, specifically a refrigerant, is compressed, is driven via the drive shaft 10 that is connected to the rotor 8 of the electric motor 3. As per an embodiment not shown, the compression mechanism can, for example, also be produced with a wobble plate.

The switching device 6 for controlling operation of the electric motor 3 exhibits a PCB 12 that is produced with various switching elements 11. Various control circuits and components are premounted on the PCB 12 with electrical connections and powered by an external power source.

Figure 1B:
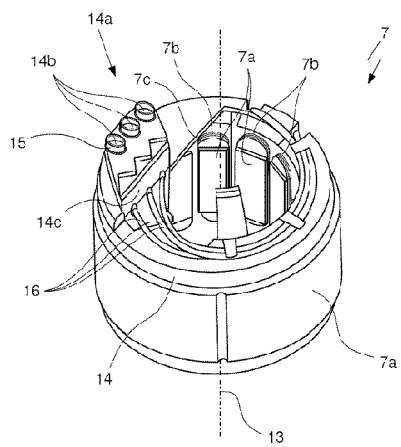
FIG. 1B: A perspective view, showing a stator of the electric motor with a stator core, coils, insulation and a support element.

FIG. 1B shows a perspective view of a stator 7 of the electric motor 3. The stator 7 is produced with a stator core 7a, coils 7b, insulation 7c, as well as a support element 14 with a mounting element 14a for a connector housing 14c.

The electric motor 3, for example an AC motor with three phases, exhibits the rotor (not shown) and the stator core 7a, which is arranged on an outer surface of the rotor in the radial direction, and thereby around the rotor. The stator core 7a, preferably produced as a laminated core, and the insulation 7c, produced from an electrically insulating material, each extend along a longitudinal axis 13, which also corresponds to the longitudinal axis of the stator 7 and the rotary axis of the rotor, from a first end face to a second face of the stator 7.

The coils 7b are each produced from a wire that is wrapped around a section of the stator core 7a and extends inwardly in the radial direction as an electrical conductor, also referred to as a conducting wire 16. The non-wound ends of the conducting wires 16 exit the respective winding as connection lines. The conducting wires 16 are advantageously produced from coated and wound copper wire in the area of the coils 7b, wherein the non-wound ends of the conducting wires 16 are preferably sheathed in a plastic insulation as connection lines.

The stator core 7a, the insulation 7c and the coils 7b form the stator unit of the electric motor 3.

On a first end face of the stator 7, the support element 14 is arranged with the mounting element 14a with connection pass-through 14b for the connector housing 14c with connection ports. The connections of the connector housing 14c serve only as components of an electrical connection between the coils 7b of the electric motor 3 and the inverter 5 (not shown), in particular electrically conductive, pin-type connecting elements, which are arranged such that they are guided through the connection pass-throughs 14b of the mounting element 14a on the support element 14 and are inserted into the connections of the connector housing 14c.

The connection lines of the conducting wires 16 of the coils 7b and the connections of the connector housing 14c arranged in the mounting element 14a are electrically interconnected.

When the stator 7 is fitted, the support element 14 with the mounting element 14a, as well as the connector housing 14c arranged in the mounting element 14a, is in contact with the stator 7 in the axial direction, in particular with the stator core 7a. Here, the mounting element 14a for the connector housing 14c is produced as a component of the support element 14. The support element 14 with the mounting element 14a with the connection pass-throughs 14b for the connector housing 14c with the connection ports is produced as a unit, in particular a one-piece injection molded element. The one-piece formation is produced in a molding process.

The connection pass-throughs 14b are provided inside the housing of the mounting element 14a for guiding the connection elements, as electrical connectors to the inverter 5 (not shown), through the housing of the mounting element 14a and into the connector housing 14c. The connection pass-throughs 14b are aligned in the axial direction.

Each connection pass-through 14b of the mounting element 14a for mounting a connecting element is produced with a wall 15 that extends in the axial direction. The wall 15 exhibits the shape of a hollow circular cylinder that projects beyond the housing of the mounting element 14a surrounding the connector housing 14c in the area of the connection pass-through 14b. The wall 15 is produced around the circular connection pass-through 14b in the area of the connection pass-through 14b as a part of the mounting element 14a, in particular of the housing of the mounting element 14a that surrounds the connector housing 14c. The wall 15 of the connection pass-through 14b is consequently connected to the housing of the mounting element 14a with a first end that is aligned in the axial direction or a first end face around the connection pass-through 14b.

Figure 2A:
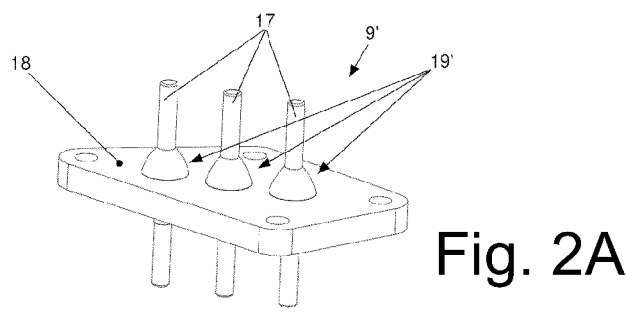
FIG. 2A: A perspective view of a feedthrough of a seal arrangement for connection elements with a retaining element and form elements for establishing electrical connections between connections arranged in the connector housing and connections of the inverter as per the state of the art.
Figure 2B:
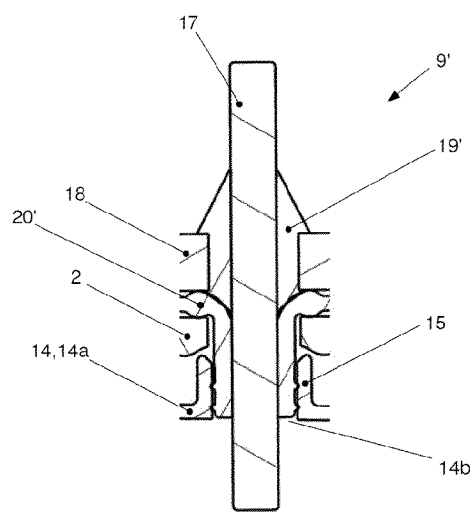
FIG. 2B: A sectional view of a section of a seal arrangement with the feedthrough from FIG. 2A with a sealing element as per the state of the art.

FIG. 2A shows a perspective view of a connection arrangement 9', in particular a glass-to-metal electric feedthrough, of a seal arrangement for connection elements 17 with a retaining element 18, as well as form elements 19' for establishing electrical connections between connections arranged in the connector housing 14c (not shown) and connections of the inverter 5 (also not shown) as per the state of the art. FIG. 2B shows a sectional view of a section of a seal arrangement with the connection arrangement 9' from FIG. 2A with a sealing element 20' for sealing off, specifically the plug-in connectors 17, against the housing 2, as well as against the mounting element 14a as per the state of the art.

The connection elements 17 are, as in particular shown in FIG. 2A, arranged such that they are guided through the plate-shaped retaining element 18. Each connecting element 17 that exhibits the shape of a straight pin, hereinafter also referred to as a plug-in connectors 17, is produced such that it exhibits three different sections that are aligned along a common axis, in particular a longitudinal axis. Here, a first section and a second section each project out of the opposing surfaces of the plate-shaped retaining element 18. A third section of the plug-in connector 17 is arranged inside the retaining element 18.

The plug-in connectors 17, preferably produced as a straight circular cylinders with constant diameter across their length, are each arranged with their third section inside a pass-through opening provided in the retaining element 18. The inner diameter of the pass-through opening corresponds to the outer diameter of the plug-in connector 17 here, plus some play for mounting and fixing the plug-in connector 17 inside the pass-through opening. The gap that is formed between the plug-in connector 17 and the wall of the retaining element 18 that surrounds the pass-through opening is filled out by the form element 19', in particular a glass form element. The form element 19' which fills the gap, and is preferably produced from a glass, serves to fix the plug-in connector 17 inside the pass-through opening and thereby to the retaining element 18, as well as to insulate the electrically conductive plug-in connector 17 against the retaining element 18. Here, the form element 19' projects out of the plane of the respective surface on the retaining element 18 in the direction of the plug-in connector 17. The projections of the form element 19' each essentially exhibit the shape of a cone or truncated cone.

The shape of the projection, specifically of the glass projection, which is extremely difficult to adjust and reproduce, is subject to very large deviations due to the manufacturing process, in particular since the tolerances of all tools are added together during the manufacturing process. To cover or seal off the free surfaces on the projection of the form element 19', a sealing element 20' is required that itself exhibits the shape of a sleeve with a perfectly tailored surface that should compensate for the major deviations both with a high degree of flexibility and a high degree of precision.

As shown in FIG. 2B, a sealing element 20' is arranged on the side of the retaining element 18 that is aligned with the housing 2 or the mounting element 14a of the support element 14 that seals off the retaining element 18 with the plug-in connector 17 projecting from the retaining element 18 and the form element 19' towards the mounting element 14a. Here, the plug-in connector 17 and the form element 19' are also electrically insulated from the mounting element 14a using the sealing element 20', itself preferably produced as an elastomer collar or elastomer sleeve with perfectly tailored surface. The section of the sealing element 20' that is in contact with the wall surrounding the connection pass-through 14b of the mounting element 14a exhibits additional sealing lips that are produced around the entire perimeter.

The sealing element 20' seals off the open or free metal surface of the plug-in connector 17 in order to meet the insulation resistance requirement of the electrical connection. Alongside the free metal surface of the plug-in connector 17, the free surface of the form element 19' is also covered using the sealing element 20' in order to avoid any oil or dirt from collecting on the form element 19'. The sealing element 20' also serves to increase the creepage distances between the plug-in connector 17 and the metal plate of the retaining element 18 here.

However, in particular the demanding requirements in terms of precision cannot be guaranteed with the sealing element 20' that is produced as a molded elastomer part.

Figure 3A:
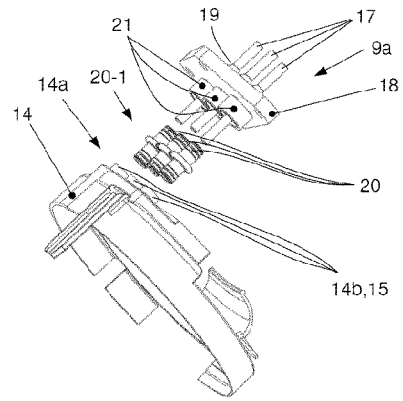
FIG. 3A: An exploded perspective view of a support element with a mounting element, a connection arrangement with connecting elements, as well as a function element arrangement of a sealing-and-insulating arrangement, exhibiting a retaining element and a function element.

FIG. 3A provides an exploded perspective view of a sealing-and-insulating arrangement that exhibits a support element 14 with the mounting element 14a, a connection arrangement 9a with connecting elements 17, as well as a retaining element 18, in particular a glass-to-metal electric feedthrough, and function elements 20 of a function element arrangement 20-1.

The connection arrangement 9a is produced as a component of the sealing-and-insulating arrangement for the connection elements 17 with the plate-shaped retaining element 18 and form elements 19 for electrically connecting the connections provided in the support element 14 of the connector housing 14c (not shown) to connections on the inverter 5 (also not shown).

The connecting elements 17, which each exhibit the shape of a straight pin and are guided through the plate-shaped retaining element 18, are produced and arranged such that they create three different sections which extend along the common axis, in particular the longitudinal axis. The first section and the second section project beyond the opposing surfaces of the retaining element 18, while the third section of each plug-in connector 17 is arranged inside a pass-through opening on the retaining element 18. The plug-in connector 17, preferably produced as a straight circular cylinder with constant diameter across its length, is attached with its third section in the retaining element 18.

The gap produced between the plug-in connector 17, in particular the third section of the plug-in connector 17, and the wall of the retaining element 18 that wraps around the pass-through opening is filled out by the form element 19, in particular the glass form element, as electrical insulation between the plug-in connectors 17 and the retaining element 18. Here, the form element 19 projects beyond the plane of the surface on the retaining element 18 that is aligned with the inverter 5 (not shown) in the direction of the second section of the plug-in connector 17. The projection essentially exhibits the shape of a cone or truncated cone.

The first section of the plug-in connector 17, which projects beyond the plane of the surface on the retaining element 18 that is aligned with the support element 14 in the direction of the retaining element 18, is fully enclosed by an insulation element 21, at least in the area of a transition to the retaining element 18. The insulation element 21 is preferably produced from a ceramic material in the form of a sleeve, specifically a circular hollow cylinder-shaped sleeve with two end faces, and is firmly attached to the retaining element 18 on a first end face with a connection that is fluid-tight around the entire circumference.

The insulation element 21, in particular produced as a ceramic sleeve, provides a simple and precise shape with a simple surface contour and geometry. This ceramic sleeve is easy to manufacture. The glass projection with a high degree of dimensional inaccuracy, which is known from the state of the art, is substituted by the precise positioning of the ceramic sleeve in the tool.

In the area of the first end face, the insulation element 21 exhibits a diameter that tapers as it moves towards the end face. The second end face, which is aligned distally to the first end face and towards the support element, is produced as a free end. The plug-in connector 17 projects beyond the insulation element 21 with its first section on the second end face of the insulation element 21.

The plug-in connector 17, for example produced in a circular cylinder shape with constant external diameter, and the insulation element 21, in particular produced with a circular hollow cylinder shape and featuring a constant internal diameter, are arranged and aligned coaxially with one another in such a way that a gap of essentially constant width is formed between the plug-in connector 17 and the insulation element 21.

The slot-like intermediate space between the plug-in connector 17 and the insulation element 21 is used to mount a function element 20. Here, the function element 20 is firstly in contact with the wall of the insulation element 21 at least on the inner surface via an outer surface of a first section. Secondly, the function element 20 can be guided into the connection pass-through 14b, which is produced on the mounting element 14a, fully enclosed by the wall 15 and used for mounting the plug-in connector 17, meaning that the function element 20 is in contact with the inner surface of the wall 15 of the connection pass-through 14b via an outer surface of a second section.

Since the connection arrangement 9a exhibits three plug-in connectors 17, the function elements 20 that correspond to the plug-in connectors 17 can be combined in a function element arrangement 20-1 and thereby be produced as a one-piece component.

Figure 3B:
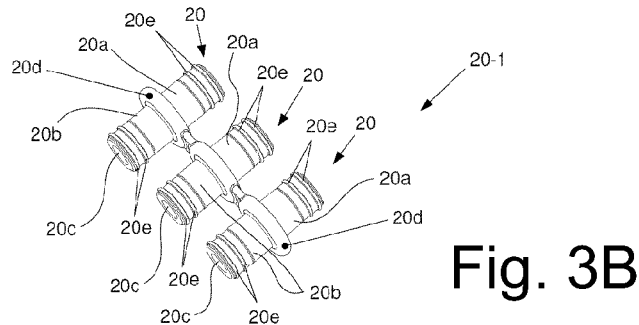
FIGS. 3B and 3C: A perspective view of the function element arrangement of the sealing-and-insulating arrangement from FIG. 3A.
Figure 3C:
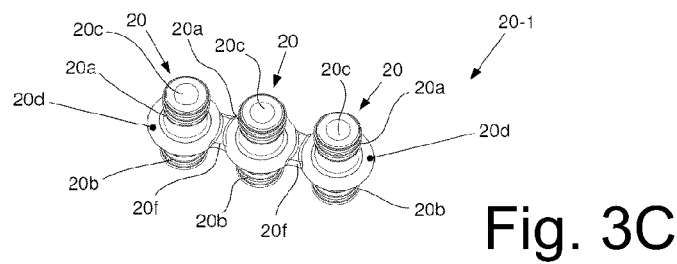

FIGS. 3B and 3C show both a perspective view and single component view of the function element arrangement 20-1 of the sealing-and-insulating arrangement from FIG. 3A that is produced from the function elements 20. As shown in FIG. 3A, each plug-in connector 17 and each insulation element 21 is sealed off against the support element 14 via a symmetrical function element 20 that is produced as a flexible/elastic unit.

Each function element 20 essentially exhibits the form of a circular hollow cylinder-shaped sleeve with a first section 20a and a second section 20b that each extend in the axial direction of the sleeve and are connected to one another via a section that is produced as a seating surface 20d. The first section 20a consequently extends from a first end face of the sleeve up to the seating surface 20d, while the second section 20b extends from a second face of the sleeve up to the seating surface 20d. The sleeve also exhibits an end-to-end pass-through opening 20c, which extends from the first end face to the second end face of the sleeve and features an internal diameter for mounting the plug-in connector 17 that preferably remains constant over its length.

The circular hollow cylinder-shaped function element 20 is produced with an essentially constant wall thickness, both in the first section 20a and in the second section 20b. The wall thickness is only increased in the area of the sealing lips 20e, which are each provided on the outer surface of the sections 20a, 20b. The sealing lips 20e are each preferably produced and arranged in pairs in such a way that the outer surface of the respective section 20a, 20b is fully enclosed. Here, each sealing lip 20e is aligned on a plane that runs vertically to the longitudinal axis of the circular hollow cylinder-shaped function element 20. The sealing lips 20e, which are produced in pairs, are each arranged such that they are spaced evenly apart from one another.

Just like the sealing lips 20e, the seating surface 20d is aligned on a plane that runs vertically to the longitudinal axis of the circular hollow cylinder-shaped function element 20 and projects in the radial direction beyond the outer surfaces of the sections 20a, 20b. The function element 20 is consequently also produced with a greater wall thickness in the area of the seating surface 20d than in the areas of the sections 20a, 20b without sealing lips 20e. The seating surface 20d, which is essentially arranged on a plane of symmetry of the function element 20 such that it fully encloses the function element 20, exhibits a certain thickness in the axial direction that is greater than the thickness of a sealing lip 20e. The wall thickness of the function element 20 is also greater in the area of the seating surface 20d than in the area of a sealing lip 20e.

Since the connection arrangement 9a, as shown in FIG. 3A, exhibits three plug-in connectors 17 with three insulation elements 21, the three respective, accompanying function elements 20 are advantageously combined to produce one common component, the function element arrangement 20-1. The three function elements 20 are each coupled to one another via connection bridges 20f in the area of the seating surfaces 20d in such a way that the longitudinal axes of the function elements 20 are aligned parallel to one another and the longitudinal axes of adjacent function elements 20 are aligned such that they are equally spaced from one another. The longitudinal axes of the three function elements 20 are arranged on a common plane. As a function element arrangement 20-1, the function elements 20, which are connected to one another via the connection bridges 20f, are produced as a coherent, single-piece component.

Figure 4A:
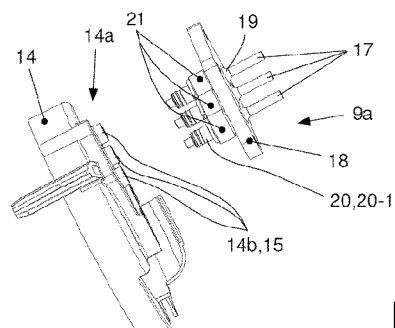
FIG. 4A: An exploded perspective view of the support element with the mounting element, the connection arrangement with the retaining element and the connecting element, as well as the function element of the sealing-and-insulating arrangement.
Figure 4B:
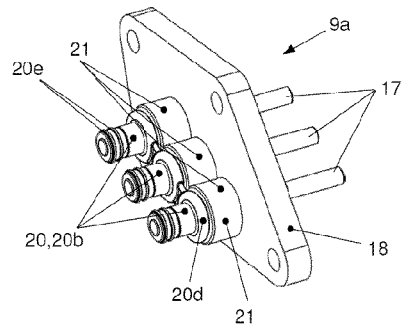
FIG. 4B: A detailed side view of the connection arrangement with the retaining element, a connecting element and an insulation element, as well as a function element of the sealing-and-insulating arrangement that is arranged in the insulation element.

FIG. 4A shows an exploded perspective view of the support element 14 with the mounting element 14a, the connection arrangement 9a with the retaining element 18 and the connecting elements 17, as well as the function elements 20 of the sealing-and-insulating arrangement, while FIG. 4B shows a detailed side view of the connection arrangement 9a with the retaining element 18, a connecting element 17 and an insulation element 21, as well as a function element 20 of the sealing-and-insulating arrangement that is arranged in the insulation element 21.

During the process of assembling the connection arrangement 9a and the function element arrangement 20-1, the function elements 20 are each connected to a plug-in connector 17 and inserted into the slot-like, in particular circular ring-shaped, intermediate space between the plug-in connector 17 and the insulation element 21 with the first section 20a. Here, the function elements 20 are preferably slid into the insulation element 21 until the seating surface 20d of the function element 20 is in contact with the second end face of the insulation element 21. In the area of the first end face, the insulation element 21 exhibits a diameter that tapers as it moves towards the end face with a connection to the retaining element 18 that is both firm and fluid-tight.

After insertion, the function element 20 is also in contact with the inner surface of the wall of the insulation element 21 via the outer surface of the non-visible first section 20a and the sealing lips 20e produced on the outer surface. In addition to this, the function element 20 can be in contact with a pass-through opening 20c (also not visible) on the plug-in connector 17 via an inner surface.

According to an alternative embodiment (not shown), the function element is arranged with the first section on an outer surface of the insulation element such that the insulation element is fully enclosed. Here, the insulation element is advantageously produced with a smaller outer diameter than is the case with the embodiment as per FIG. 3A, 4A, or 4B. The gap between the plug-in connector and the inner surface of the insulation element exhibits a minimum width.

The function elements 20 of the function element arrangement 20-1 are each arranged such that their second sections 20b are aligned with the mounting element 14, in particular the connection pass-throughs 14b with the walls 15 of the mounting element 14a.

Figure 4C:
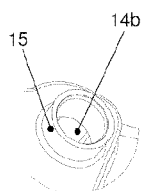
FIG. 4C: A detailed view of a connection pass-through of the support element with wall for connecting a connecting element and a function element.

FIG. 4C shows a detailed view of a connection pass-through 14b of the support element 14 with the wall 15 that extends in the axial direction of the connection pass-through 14b for receiving a plug-in connector 17 and a function element 20. The wall 15, which exhibits the shape of a hollow circular cylinder, projects from the housing of the mounting element 14a that surrounds the connector housing 14c (not shown) in the area of the connection pass-through 14b and is attached with a fluid-tight connection to the housing of the mounting element 14a on a first end that is aligned in the axial direction or a first end face that surrounds the connection pass-through 14b. As per FIG. 4A, a second end or a second face is aligned in the direction of the connection arrangement 9a. In the further process of assembling the connection arrangement 9a with the function element arrangement 20-1, the plug-in connectors 17 are inserted into the connection pass-throughs 14b of the mounting element 14a on the support element 14 with the function elements 20 arranged on them.

Figure 4D:
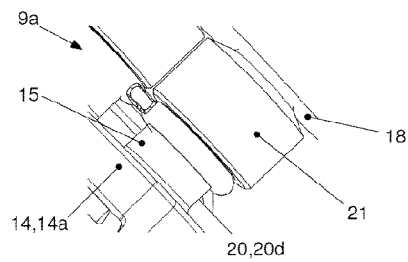
FIG. 4D: A detailed side view of the support element with the mounting element, as well as the connection arrangement with the function element of the sealing-and-insulating arrangement arranged on the support element and on the connection arrangement, as well as FIG. 5: A side view and sectional view of the support element with a wall of the mounting element and a connection arrangement with the connecting element, as well as the retaining element in an alternative embodiment of a sealing-and-insulating arrangement without function elements or sealing elements.

FIG. 4D shows a detailed side view of the assembled support element 14 with the mounting element 14a, as well as the connection arrangement 9a with the function element 20 of the sealing-and-insulating arrangement assembled on the wall 15 and on the connection arrangement 9a.

When the sealing-and-insulating arrangement is mounted, the function elements 20 of the function element arrangement 20-1 are arranged with the second section 20b (not visible) in the slot-like, in particular circular ring-shaped, intermediate space between the plug-in connector 17 and the wall 15 of the mounting element 14a. Here, the connection arrangement 9a with the function element 20 is preferably slid into the mounting element 14a until the seating surface 20d of the function element 20 is in contact with the second end face of the wall 15.

After insertion, the function element 20 is also in contact with the inner surface of the wall 15 of the mounting element 14a via the outer surface of the non-visible first section 20b and the sealing lips 20e produced on the outer surface.

The seating surface 20d of the function element 20 that is arranged between the end faces of the wall 15 and the insulation element 21 also guarantees tolerance compensation of the components in the axial direction.

Alongside securing fluid-tight sealing of the electrical connections, in particular inside the compressor housing, between the connections arranged in the connector housing and the connections of the inverter, which are arranged outside the housing of the compressor, in their function as sealing elements and insulation elements, the function elements 20, preferably produced from an elastomer, also serve as electrical insulation, in particular covering live, metallic surfaces and interrupt the air paths as potential spark gaps or creepage distances between the live components and components connected to earth, particularly at high voltages. The respective insulation resistances are increased. In addition to this, a collection of oil, dirt and particles is prevented in the area of the plug-in connectors.

In connection with the mounting element 14a or the support element 14 and the housing 2, the sealing-and-insulating arrangement consequently serves firstly to seal off the inside of the electric motor 3 with the stator 7 and the rotor 8, i.e. the inside of the housing 2, against the environment and secondly to seal off and insulate the plug-in connectors or connections arranged inside the connector housing against the inside of the housing 2 and thereby against the fluid flowing in the housing 2.

According to an alternative, advantageous embodiment, the function elements are produced with the support element as a single-piece component. Here, the function elements and the support element can be produced either as a two-component element or from the same material, and thereby as a single-component element, meaning that the production of separate function elements is avoided with both embodiments.

Figure 5:
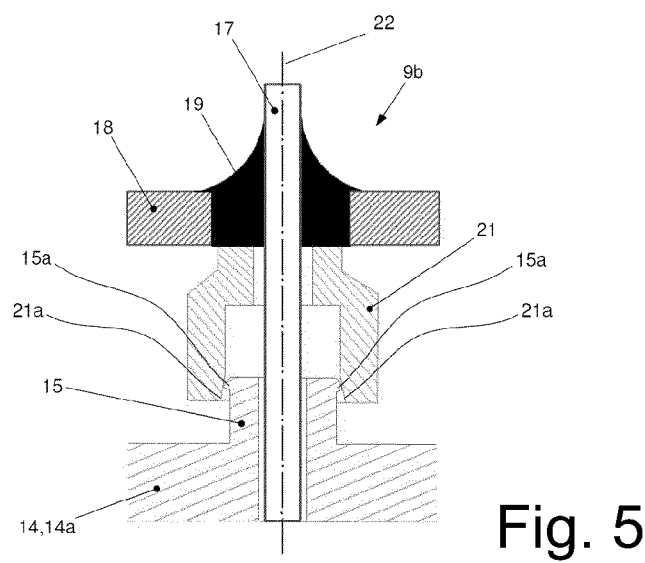

FIG. 5 shows a side view and sectional view of the support element 14 with the wall 15 of the mounting element 14a and a connection arrangement 9b with the connecting element 17 and the retaining element 18 in an alternative embodiment of a sealing-and-insulating arrangement without function elements or sealing elements.

Production of the connection arrangement 9b with the plug-in connector 17, the retaining element 18, the form element 19 and the insulation element 21 essentially corresponds, with the stated components, to production of the connection arrangement 9a shown in the Figs. provided above, specifically FIG. 3A, so reference is made to the designs shown in these Figs. In comparison with the first alternative embodiment, the sealing-and-insulating arrangement does not exhibit any function elements.

The plug-in connector 17 that is guided through the plate-shaped retaining element 18 projects beyond the opposing surfaces of the retaining element 18 with its first section and second section, while the third section of the plug-in connector 17 is arranged inside the pass-through opening of the retaining element 18. The gap formed between the third section of the plug-in connector 17 and the wall of the retaining element 18 that surrounds the pass-through openings is filled by the form element 19, which projects beyond the plane of the surface on the retaining element 18 that is aligned with the inverter 5 (not shown) in the direction of the second section of the plug-in connector 17.

The first section of the plug-in connector 17, which projects beyond the plane of the surface on the retaining element 18 that is aligned with the support element 14, is fully enclosed by an insulation element 21, at least in the area of a transition to the retaining element 18. The insulation element 21 is preferably produced from a ceramic material in the form of a sleeve, specifically a circular hollow cylinder-shaped sleeve with two end faces, and is firmly attached to the retaining element 18 on a first end face with a connection that is fluid-tight around the entire circumference.

In the area of the first end face, the insulation element 21 exhibits a diameter that tapers as it moves towards the end face. The second end face, which is aligned distally to the first end face and to the support element 14, is produced as a free end. The plug-in connector 17 projects beyond the insulation element 21 with its first section on the second end face of the insulation element 21. The plug-in connector 17, produced with a constant external diameter, and the insulation element 21 are arranged and aligned coaxially with one another along an axis 22 in such a way that a gap is formed between the plug-in connector 17 and the insulation element 21. The slot-like intermediate space between the plug-in connector 17 and the insulation element 21 is used to mount the wall 15 of the mounting element 14a.

The wall 15 of the mounting element 14a that is produced around the connection pass-through 14b projects beyond the mounting element 14a in the direction of the axis 22, aligned towards the insulation element 21. The plug-in connector 17 is arranged with the first section inside the connection pass-through 14b.

The wall 15 is arranged such that the section of the second end face is inserted into the slot-like intermediate space between the plug-in connector 17 and the insulation element 21. Here, the connection arrangement 9b was moved in such a way that the insulation element 21 was slid over the second end face of the wall 15 with the second end face first.

In the area of the second end face, the wall 15 exhibits a formation 15a in the form of a bulge, which is produced such that it covers the entire outer surface. In the area of the internal surface of the second end face, the insulation element 21 exhibits a chamfer that is arranged around the entire circumference, meaning that the internal diameter of the insulation element 21 is produced such that it gets larger as it moves towards the second end face. The surface of the chamfer is also referred to as the sealing surface 21a in the following. The formation 15a of the wall 15 and the sealing surface 21a of the insulation element 21 are each aligned on a plane that runs vertically to the axis 22.

After completing the process of inserting the wall 15 into the slot-like intermediate space between the plug-in connector 17 and the insulation element 21, leading with the section of the second end face, the formation 15*a* is in fluid-tight contact with the sealing surface 21*a*, meaning that the wall 15 and the insulation element 21 are arranged such that they are sealed off from one another. As a result of the conical shape of the sealing surface 21*a* along the axis 22, the insulation element 21 and the wall 15 can be moved towards one another in the direction of the axis 22 in such a way that the wall 15 is elastically deformed and a fully sealed connection between the formation 15*a* of the wall 15 and the sealing surface 21*a* of the insulation element 21 is produced around the entire circumference. Here, the sealing surface 21*a* fully encloses the formation 15*a* that is produced on the outer surface of the wall 15 around the entire circumference.

The wall 15 is pressed into the insulation element 21. In the end position, the conically tapering diameter of the sealing surface 21*a* is small enough that a sufficient pressure is exerted around the entire circumference, thereby securing the sealing function. Consequently, the tightness of the arrangement results from the wall 15 with the formation 15*a* being pressed into the conical sealing surface 21*a* of the insulation element 21, wherein a requisite surface pressure is achieved between the components involved, i.e. the wall 15 and the insulation element 21, to create an effective seal. The opening angle of the sealing surface 21*a* is dimensioned in such a way that a self-locking interference fit is produced which generates the requisite pressing forces.

LIST OF REFERENCE NUMBERS

1 Compressor
2 Housing
3 Device, electric motor
4 Compression mechanism
5 Inverter
6 Switching device
7 Stator
7*a* Stator core
7*b* Coil
7*c* Insulation
8 Rotor
9, 9*a*, 9*b*, 9' Connection arrangement
10 Drive shaft
11 Switching element
12 PCB
13 Longitudinal axis
14 Support element
14*a* Mounting element
14*b* Connection pass-through
14*c* Connector housing
15 Wall, connection pass-through 14*b*
15*a* Formation
16 Conducting wire
17 Connecting element, plug-in connector
18 Retaining element
19, 19' Form element
20' Sealing element
20 Function element
20-1 Function element arrangement
20*a* First section, function element 20
20*b* Second section, function element 20
20*c* Pass-through opening, function element 20
20*d* Seating surface, function element 20
20*e* Sealing lips, function element 20
20*f* Connection bridge, function element arrangement 20-1
21 Insulation element
21*a* Sealing surface
22 Axis

The invention claimed is:

1. A sealing-and-insulating arrangement for guiding electrical connections through a housing for a device used for driving a compressor, exhibiting a connection arrangement, the sealing-and-insulating arrangement comprising:
at least one electrically conductive connecting element;
a retaining element; and
a support element with a mounting element having a connection pass-through that is fully enclosed by a wall, wherein the at least one connecting element is itself arranged and fully enclosed by the retaining element and has both a form and fluid-tight connection to the retaining element via a form element in such a way that the at least one connecting element projects out of the retaining element with a first section and a second section, wherein the at least one connecting element is arranged in such a way that the first section reaches through the connection pass-through and into the mounting element, and wherein at least the first section of the at least one connecting element is enclosed in full at least zonally by an insulation element that has a firm connection to the retaining element and stretches from the retaining element in a direction of a wall of the support element and also encloses the first section of the at least one connecting element in a fluid-tight way in connection with the wall, wherein at least one function element is produced, which is arranged in such a way that it seals a wall of the mounting element and the insulation element with one another, wherein the at least one function element exhibits the shape of a sleeve with a first section and a second section that each stretch in an axial direction and are connected to one another via a section that is produced as a seat, and wherein the first section of the function element is arranged in a slot-like intermediate space that is produced between the at least one connecting element and the insulation element and that the second section of the function element is arranged in a slot-like intermediate space that is produced between the at least one connecting element and the wall of the connection pass-through of the mounting element.

2. The sealing-and-insulating arrangement according to claim 1, wherein only the first section of the at least one connecting element is enclosed in full by the insulation element at least zonally.

3. The sealing-and-insulating arrangement according to claim 1, wherein the at least one connecting element is produced with a cylindrical shape as a pin-like plug-in connector.

4. The sealing-and-insulating arrangement according to claim 1, wherein the at least one connecting element is produced as a circular cylindrical shape with a constant external diameter.

5. The sealing-and-insulating arrangement according to claim 1, wherein the wall that encloses the connection pass-through of the mounting element is aligned in an axial direction to the housing in a way that projects from the mounting element.

6. The sealing-and-insulating arrangement according to claim 5, wherein the wall is produced with a circular hollow cylinder shape and connected in full to the mounting element with a first end face that is aligned in the axial direction, and wherein a second end face is aligned in a direction of the connection arrangement.

7. The sealing-and-insulating arrangement according to claim 1, wherein the insulation element exhibits the shape of a sleeve with two end faces.

8. The sealing-and-insulating arrangement according to claim 7, wherein a first one of the end faces of the insulation element is produced with a firm and fully fluid-tight connection to the retaining element and a second one of the end faces of the insulation element, itself aligned distally to the first end face, is aligned towards the support element and produced as a free end.

9. The sealing-and-insulating arrangement according to claim 1, wherein the insulation element is produced from a ceramic material.

10. The sealing-and-insulating arrangement according to claim 1, wherein the at least one connecting element and the insulation element are aligned coaxially with one another in such a way that a gap is produced between the at least one connecting element and the insulation element.

11. The sealing-and-insulating arrangement according to claim 1, wherein the retaining element is produced in a plate shape with surfaces arranged opposite one another and at least one pass-through opening for mounting the at least one connecting element, wherein the first section and the second section of the at least one connecting element are arranged in such a way that they project out of the opposing surfaces of the retaining element and a third section of the at least one connecting element is arranged inside the pass-through opening.

12. The sealing-and-insulating arrangement according to claim 1, wherein a gap produced between the at least one connecting element and the retaining element is filled by the form element.

13. The sealing-and-insulating arrangement according to claim 1, wherein the form element is produced as a glass form element.

14. The sealing-and-insulating arrangement according to claim 1, wherein the first section and the second section each exhibit an essentially constant wall thickness, wherein at least one sealing lip is produced on an outer surface of the first section and the second section and projects from the outer surface.

15. The sealing-and-insulating arrangement according to claim 14, wherein the at least one sealing lip is produced in such a way that the at least one sealing lip fully enclose the outer surface of a respective one of the first section and the second section.

16. The sealing-and-insulating arrangement according to claim 15, wherein the seat of the function element is produced in such a way that it projects over outer surfaces of the first section and the second section in a radial direction and the function element is fully enclosed.

17. The sealing-and-insulating arrangement according to claim 1, wherein an outer surface of the first section of the function element is arranged in contact with an inner surface of a wall of the insulation element and an outer surface of the second section of the function element is arranged in contact with an inner surface of the wall of the connection pass-through of the mounting element.

18. The sealing-and-insulating arrangement according to claim 17, wherein an equal number of function elements are produced with formation of at least two connecting elements, the wall of the connection pass-through and the insulation element, wherein the function elements are produced as a one-piece function element arrangement.

19. The sealing-and-insulating arrangement according to claim 18, wherein two of the function elements, arranged adjacently to one another in the area of the seat, are connected to one another via connection bridges.

20. The sealing-and-insulating arrangement according to claim 17, wherein the function element is produced with the support element as a one-piece component.

21. A sealing-and-insulating arrangement for guiding electrical connections through a housing for a device used for driving a compressor, exhibiting a connection arrangement, the sealing-and-insulating arrangement comprising:
at least one electrically conductive connecting element;
a retaining element; and
a support element with a mounting element having a connection pass-through that is fully enclosed by a wall, wherein the at least one connecting element is itself arranged and fully enclosed by the retaining element and has both a form and fluid-tight connection to the retaining element via a form element in such a way that the at least one connecting element projects out of the retaining element with a first section and a second section, wherein the at least one connecting element is arranged in such a way that the first section reaches through the connection pass-through and into the mounting element, wherein at least the first section of the at least one connecting element is enclosed in full at least zonally by an insulation element that has a firm connection to the retaining element and stretches from the retaining element in a direction of a wall of the support element and also encloses the first section of the at least one connecting element in a fluid-tight way in connection with the wall, wherein at least one function element is produced, which is arranged in such a way that it seals a wall of the mounting element and the insulation element with one another, and wherein the wall of the mounting element, as well as the insulation element of the connection arrangement are arranged in contact with one another and create a seal.

22. The sealing-and-insulating arrangement according to claim 21, wherein the wall of the mounting element exhibits a bulging form on an outer surface in a section of a second end face, produced distally to a first end face, that stretches all the way around the wall of the mounting element.

23. The sealing-and-insulating arrangement according to claim 22, wherein the insulation element exhibits a full-scope sealing surface in a form of a chamfer on an inner surface in a section of a second end face, produced distally to a first end face, wherein an internal diameter of the insulation element is produced in such a way that it increases towards the second end face.

24. The sealing-and-insulating arrangement according to claim 23, wherein the wall of the mounting element is arranged in a slot-like intermediate space that is produced between the at least one connecting element and the insulation element, wherein the wall of the mounting element is in fluid-tight contact with the form on the sealing surface of the insulation element.

25. A device to drive a compressor of a vaporous fluid, in particular an electric motor, comprising a rotor and a stator, which are arranged along a common longitudinal axis, as well as the housing, wherein the support element with the mounting element for at least one connector housing is arranged with contact on a first end face of the stator, aligned in an axial direction, wherein the mounting element includes the connection pass-through with the wall for mounting the at least one connecting element and wherein the device is produced with the sealing-and-insulating arrangement according to claim 1.

26. A use of the device for driving the compressor, in particular the electric motor, for compressing the vaporous fluid, according to claim 25 for the compressor of a refrigerant in a refrigerant circuit of a motor vehicle air-conditioning system.

* * * * *